Oct. 31, 1939.  J. C. SMALTZ ET AL  2,178,305
WINCH
Filed Oct. 2, 1936  6 Sheets-Sheet 1

Fig. 1.

JOHN C. SMALTZ
CARL W. KAHLERTH
INVENTORS
BY
ATTORNEY

Oct. 31, 1939.    J. C. SMALTZ ET AL    2,178,305
WINCH
Filed Oct. 2, 1936    6 Sheets-Sheet 2

JOHN C. SMALTZ
CARL W. KAHLERTH
INVENTORS

BY
ATTORNEY

Oct. 31, 1939.  J. C. SMALTZ ET AL  2,178,305

WINCH

Filed Oct. 2, 1936  6 Sheets-Sheet 3

JOHN C. SMALTZ
CARL W. KAHLERTH
INVENTORS

BY
ATTORNEY

Patented Oct. 31, 1939

2,178,305

UNITED STATES PATENT OFFICE 2,178,305

WINCH

John C. Smaltz, New York, N. Y., and Carl W. Kahlerth, Newark, N. J., assignors to McKiernan-Terry Corporation, New York, N. Y., a corporation of New Jersey Application October 2, 1936, Serial No. 103,698

28 Claims. (Cl. 254—172)

This invention relates particularly to winches of the type disclosed in patent application, Serial No. 8,810, filed March 1, 1935, and is a continuation in part of that case.

In that patent application, the problem of safely and expeditiously hoisting a floating object such as a boat or an airplane which has alighted on the sea, is solved by constant tensioning a line after attachment is made with the floating object, at a speed sufficient to follow the rise and fall of the waves and the roll of the ship and by converting the winch from constant tension operation to positive hoisting at a time when the object is rising with the maximum velocity afforded by the highest of a wave group and at a hoisting speed sufficient to clear the following lesser wave.

The objects of the present invention are to effect improvement of the system generally, to simplify structure, to incorporate additional safeguards and to facilitate the handling and the use of the apparatus.

Other, more detailed objects and the novel features of construction, combinations and relations of parts by which the objects are attained, will appear and are set forth in the following specification.

The drawings accompanying and forming part of this specification illustrate a present preferred commercial embodiment of the invention, but it will be understood that changes and modifications may be made, all within the true intent and scope of the invention as broadly defined in the claims.

Figure 1:
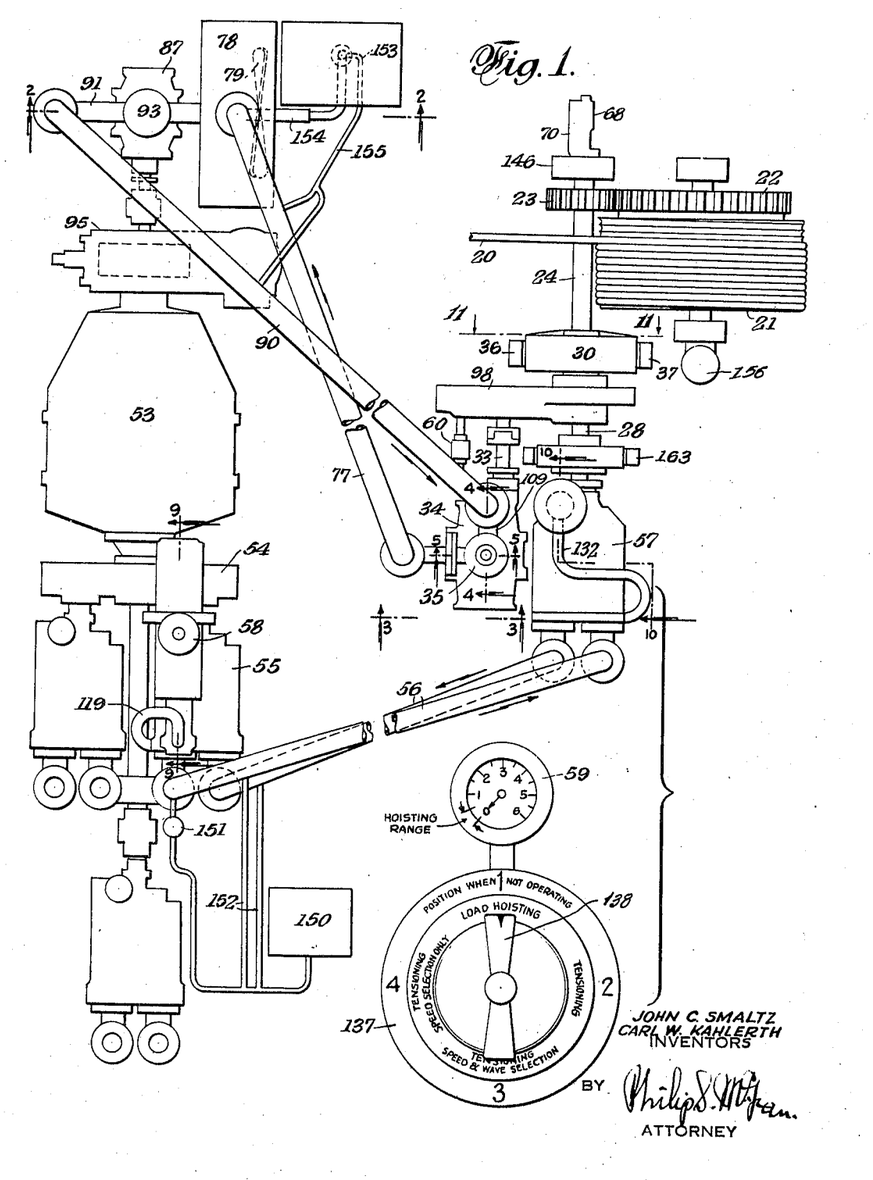
Figure 1 is a broken, general plan view of the complete installation.

Because of the ability to maintain a substantially constant tension on a line subjected to varying influences such as wave motion and the roll of a ship and the further ability, under proper conditions, to change over from constant tensioning to positive hoisting, this invention is particularly adapted to the mooring and the hoisting of seaplanes, boats or other floating objects. Figure 1 illustrates such an embodiment, but this is not intended in any way as a limitation on the many possible uses of the invention.

In a shipboard installation, such as in Figure 1, the cable 20 from the hoisting drum 21 is usually run up over a sheave at the outboard end of a hoisting boom and provided with a hook for attachment with the seaplane or other floating object. This drum is shown as having a gear 22 at one end engaged by pinion 23 on shaft 24, which for compactness of arrangement, extends across the face and to the opposite end of the drum. At such opposite end this drum driving shaft has attached to it, a cage or spider 25 carrying planetary gears 26, Figures 6 and 7, in mesh at the center with a sun gear 27 on the power shaft 28, and at the outside with a ring gear 29 carrying or forming part of a brake drum 30 which carries a gear 31 in mesh with a gear 32 on the shafting 33 of the brake pump 34.

The planetary gearing described forms a differential gear set enabling aplication of power partly to the drum and partly to the brake pump for what is termed the constant tensioning; or application of full power to the drum for positive hoisting.

Figure 4:
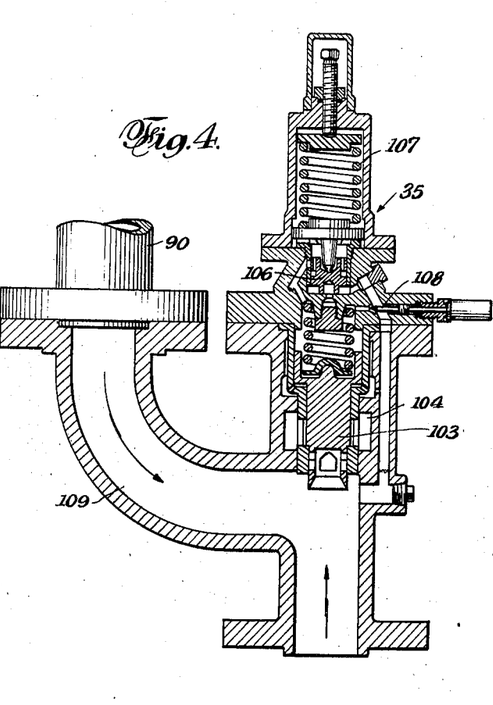
Figure 4 is an enlarged vertical sectional view of the pressure regulating valve and inlet elbow as on substantially the plane of line 4—4 of Figure 1.

Existence of these two conditions is controlled by a pressure regulating valve 35, Figure 4, for maintaining constant pressure at the pump and by a brake for holding the ring gear which forms the outer member of the planetary group. This brake is shown as consisting of diametrically opposed brake shoes 36, 37, carried by upright levers 38, 39, Figure 11, pivotally connected at the bottom by a link 40 which is pivotally mounted intermediate its ends at 41 and pivotally connected at the top by a toggle made up of link 42 pivoted at one end to the upper end of lever 38 and the opposite end to the short arm 43 of a bellcrank pivoted at 44 on the upper end of brake shoe lever 39. The long arm 45 of this bellcrank lever is shown pivotally connected by link 46 with the movable core 47 of a solenoid 48. The outer end of the bellcrank arm 45 is shown pivotally connected with the lower end of a sleeve 49 operable over an anchorage rod 50 against an upper stop 51 and pressed downwardly away from that stop by a surrounding spring 52.

Figure 11:
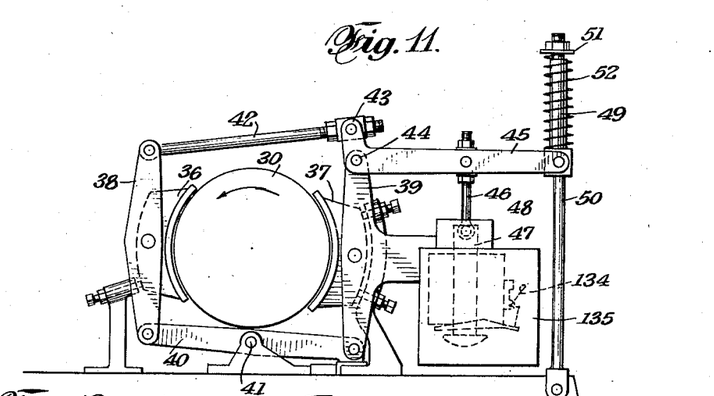
Figure 11 is a broken partly sectional view of the self-energizing planetary brake as on substantially the plane of line 11—11 of Figure 1 showing the brake in released position.
Figure 12:
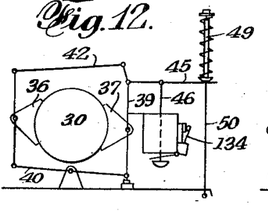
Figure 12 is a diagrammatic detail illustrating the brake set.

It will be clear from Figure 11 that the effect of spring 52 on the long arm 45 of the bellcrank is to cause the shorter arm 43 to draw the brake shoe levers 38, 39 together and to set the shoes against the brake drum. The action of the solenoid, on the other hand, is to lift the long arm 45 of the bellcrank and release the shoes from holding engagement with the brake drum substantially as shown in this view. It follows, therefore, that with the energizing circuit for the solenoid closed, the planetary brake will be released and the power be distributed differentially to hoisting drum and brake pump and that with the circuit open and the solenoid de-energized, the brake will be set to hold the ring gear and the full power then be applied to operation of the hoisting drum.

The power is furnished in the present disclosure by a uni-directional constantly running electric motor 53, Figure 1, driving through reduction gearing at 54, a pressure and manually controlled, variable speed, and reversible hydraulic pump or A-end 55, connected by piping 56 with a variable speed, reversible, hydraulic motor or B-end 57 of the automatic pressure regulated stroke type, operating the shafting 28 which carries the sun gear 27. The A-end is regulated by increase in pressure to automatically increase stroke and is further regulable by a hand wheel 58 to start, stop, reverse and run the B-end at different speeds and the B-end under increase in pressure from starting to lift the load, automatically increases its stroke, thus in combination with reduction of stroke at the A-end, reducing the hoisting speed to lift the full load. This double reduction in speed at both A-end and B-end is a feature in the change-over from constant tensioning to full hoisting and enables the apparatus to quickly adjust itself from high speed tensioning to slower speed full hoisting conditions.

For mooring or constant tensioning, after attachment of the hook with the floating object, the A-end is adjusted at 58 to run the B-end fast enough to follow the combined wave movement and roll of the ship. At approximately a proper adjustment for this effect, when upward movement of the floating object is at approximately maximum velocity, the outer member 29 of the planetary gearing will slow down and come to an approximate or complete stop. The reduction in speed of the outer member, which drives the brake pump, results from increased speed imparted to the hoisting drum by the intermediate member carrying the planetary gears 26. Consequently, reduction in speed and stoppage of the outer member 29 is an indication of the attainment of maximum speed at the drum and hence maximum upward wave speed. This condition is utilized both to indicate and to automatically change operations from constant tensioning to positive hoisting. Also, the brake for holding the outer ring gear element of the planetary is automatically set when this member is stationary, or approximately so, so that slippage and wear is largely avoided. Indication of the proper change over condition is effected in the present disclosure by an electrical instrument 59, Figures 1 and 14, energized from a magneto generator 60, driven through gears 31, 32, 61, Figure 6, from the outer planetary member 29. This instrument is suitably graduated and may desirably have a so-called "hoisting range" section 62, within which the load may be most expeditiously and safely hoisted.

Figures 14, 15:
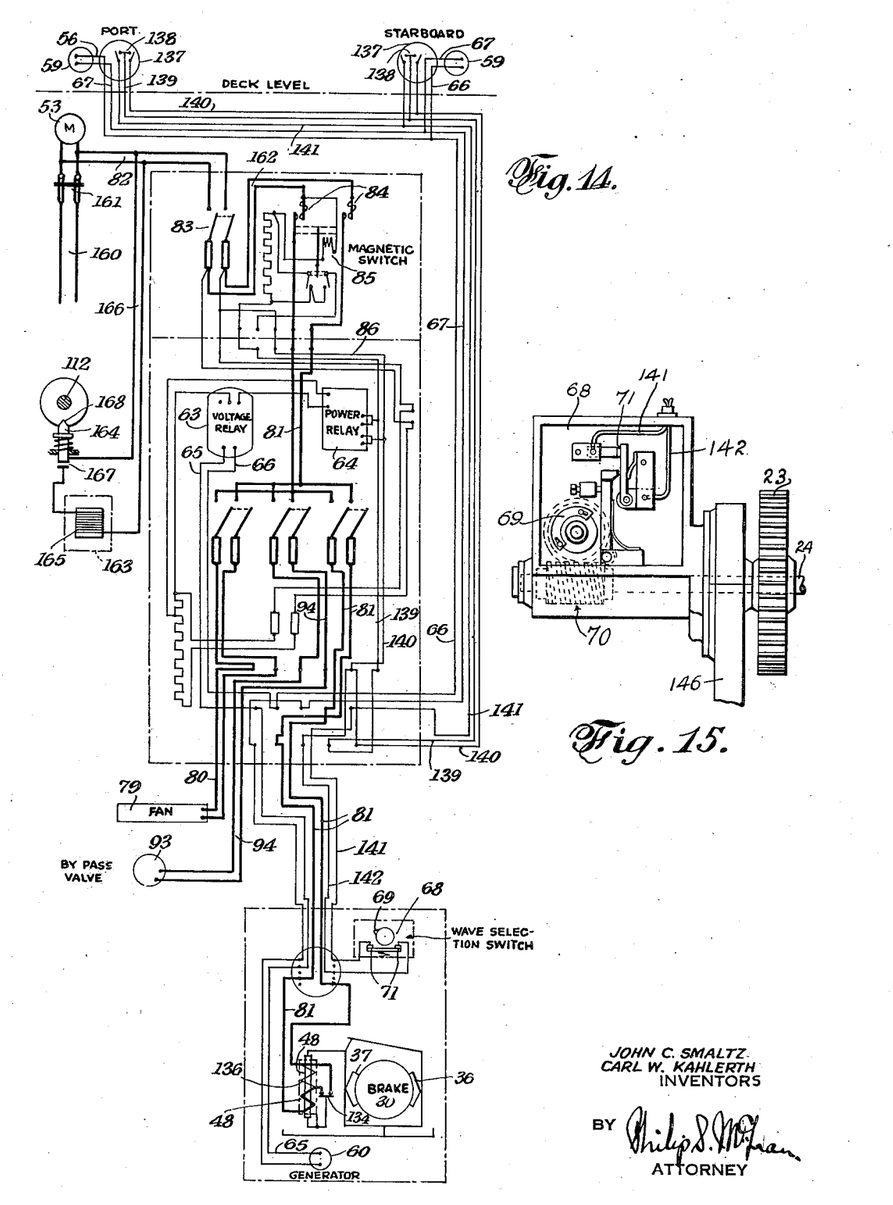
Figure 14 is a wiring diagram for the system.
Figure 15 is a broken detail view of the limit switch mechanism.

The automatic control is effected by wiring the magneto generator 60 to a sensitive, voltage relay 63, Figure 14, controlling a power relay 64, connected to govern the brake solenoid 48. This circuit may be followed by wiring 65 from one side of the magneto to the control relay 63 and from that control relay by wiring 66 to indicator 59, or, to "port" and "starboard" indicators in parallel, where there are, as usual, two control stations, and from these indicators by wiring 67 back to the generator. This puts the control relay and indicators in series with the generator so that wave motion may be followed at the indicators and with no voltage resulting from the slowing down or stoppage of the generator, under maximum upward wave speed conditions, the indicator pointers will be in the hoisting range and the control relay will cause the power relay to open the circuit of the brake solenoid and effect the setting of that brake to hold the outer planetary member 29.

For full automatic operation, however, the change to positive hoisting can only occur when the floating object is rising on the high wave of a group. This wave selection is accomplished by a wave selection switch 68, Figures 1, 14 and Fig. 15, comprising a cam 69, driven from the drum driving shaft 24, through reduction gearing at 70 and adapted to open circuit at 71, only after the drum has wound a predetermined length of line thereon. This circuit may be traced in Figure 14 as in parallel with the sensitive control relay 63 which makes it necessary that both the wave selecting switch and the wave speed control relay be at open circuit or no voltage, for the control relay to cause the power relay to de-energize the brake solenoid to effect the holding of the outer planetary member. Thus, both conditions of the object rising on a high wave and maximum wave speed must be present before the parts will cooperate to change over from constant tensioning to positive hoisting.

Figures 3, 5:
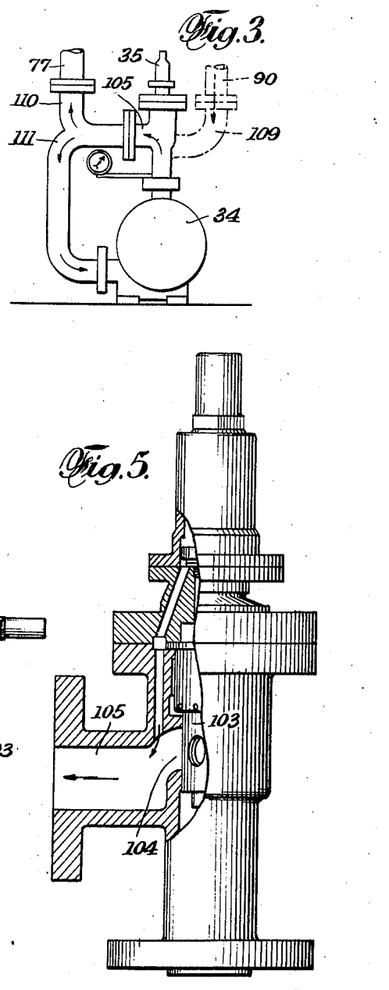
Figure 3 is an end view of the brake pump as taken on substantially the plane of line 3—3 of Figure 1, with the inlet elbow represented by dotted lines in a turned around position so that circulation may be followed.
Figure 5 is a broken view of these same parts sectioned as on line 5—5 of Figure 1 to illustrate the by-pass flow to the radiator.

The energy developed by the brake pump during constant tensioning operations is disposed of by passing the flow of oil or other medium released by the pressure regulating valve 35, Figures 1, 4 and 5, through piping 77 to radiator 78, cooled by fan 79.

This cooling effect is not necessary when the winch is converted from constant tensioning to positive hoisting and accordingly the fan motor is connected by wiring 80, Figure 14, in parallel with the energizing circuit 81 of the brake magnet, so that when the brake magnet is energized and the outer planetary element is free to drive the brake pump, as in constant tensioning, the cooling fan will be in operation and when the brake magnet is deenergized and the brake is holding the brake pump stationary, the fan will be stopped.

The motor 53 constituting the primary power source is indicated in Figure 14 as taking current from a main power circuit 160 under control of a switch 161. The energy for the other electrical elements is indicated as supplied by a branch 82 taken off above or beyond the motor switch 161, thus assuring that the brake magnet 48 will be de-energized and the brake be set any time the power is shut off. A switch 83 in the branch line 82 enables the control apparatus being independently cut off. From this switch the main power circuit of the control apparatus may be followed through connections 162 through contacts 84 of the magnetic switch 85, which latter is controlled through a local circuit 86 from the power relay 64.

Because of relatively low inertia, simplicity and reliability, the brake pump preferably may be of the gear type. At low speed leakage past the gears might be so great that the braking effect would be lost. Accordingly, in the illustration, there is provided a booster pump 87, Figures 1 and 2, connected at 88 with the discharge side of the radiator 78 and connected at 89 to piping 90 leading to the discharge side of the brake pump. A bypass is shown at 91 connecting opposite sides of the booster pump, governed by a valve 92 under control of magnet 93. The latter, as indicated in Figure 14, is connected by wiring 94 in parallel with the brake and the fan circuits so that when the brake is off, as in contant tensioning, with the bypass closed, the booster pump will be passing liquid from the radiator back to the brake pump to maintain the desired braking force, and so that when the brake is on, the bypass will be open to pass the liquid in an idle circuit about the booster pump, without loading the brake pump. This is the method of control employed where the booster pump is constantly driven, as in the illustration, Figure 1, from the constantly running electric motor 53.

Figure 6:
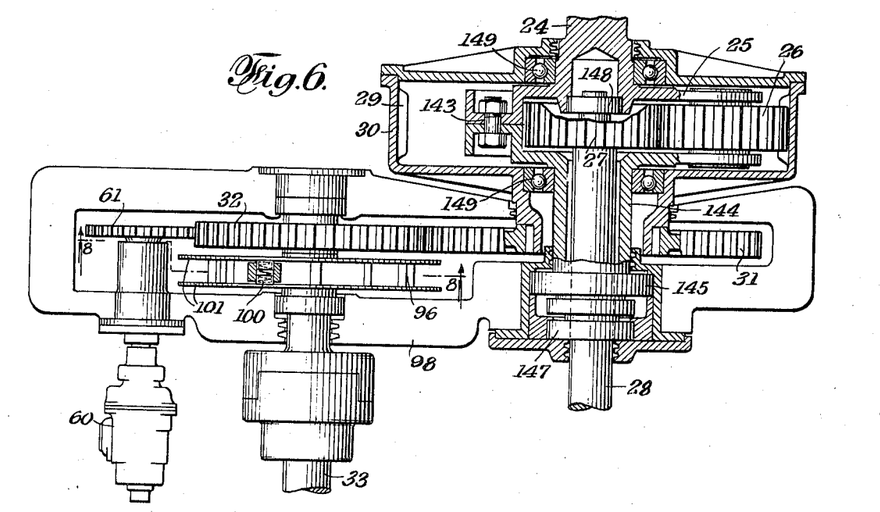
Figure 6 is a broken and partly horizontal cross sectional view of the planetary gearing employed for differential operation of the drum and brake pump, showing the non-reversing drive to the brake pump and the drive to the generator controlling the speed selecting relay and indicator.
Figure 7:
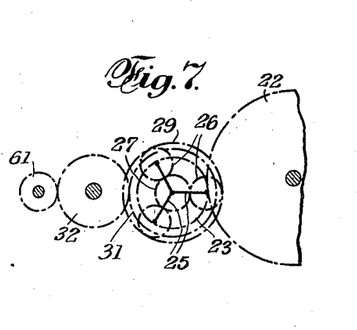
Figure 7 is a diagrammatic illustration of these last mentioned parts.
Figure 8:
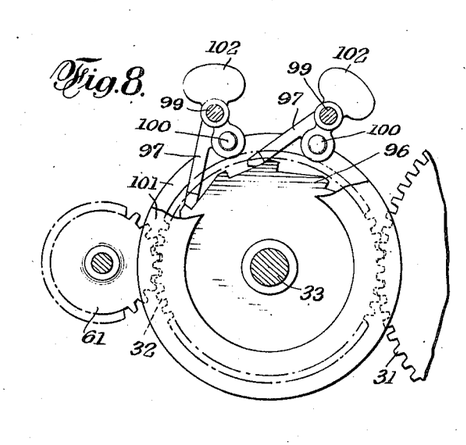
Figure 8 is a broken part sectional detail of the ratchet mechanism for preventing reverse rotation of the booster pump, substantially as on line 8—8 of Figure 6.

In controlling the empty hook in the tensioning position, particularly when lowering it at slow speed by control at the A-end, the flow from the booster pump may have a tendency to force the brake pump to turn in the reverse direction and then function as a motor which would operate to wind in the hoist line, contrary to the regulation effected from the A-end. To prevent such possibility the ratchet construction shown in Figures 6 and 8 is here provided, comprising the ratchet 96 on the brake pump shafting 33, engageable by a pawl or pawls 97, pivoted in the enclosing gear casing 98 at 99 and having resilient or spring pressed drags 100, which frictionally engage the flanges 101 at opposite sides of the ratchet. These pawls are weighted at 102 or otherwise balanced and the drags are located at the under sides of the pawls, so that with rotation in the normal direction, that is, anticlockwise in Figure 8, the flanges 101, by frictional engagement with the drags 100 will lift and hold the pawls clear of the ratchet. Any rotative movement in the opposite direction, however, will lower the pawls, as indicated in this view, to cause one or the other to engage the ratchet and immediately hold the brake pump against any reverse movement.

The pressure regulating valve 35, which controls the brake pump pressure and hence the constant tensioning force, is shown in Figures 3, 4 and 5, as of the differential type, with the ported valve element 103 controlling flow through ports 104 into the neck 105 which is connected with the piping 77, leading to the radiator with a pilot valve 106, governing action of the same.

By regulating spring pressure at 107 on the pilot valve, the braking effect is made high enough to cause sufficient acceleration of the mechanism for the drum to follow the wave forms without permitting slack in the hoist line. Still finer pressure regulation is afforded in the illustration by a needle valve 108 governing back pressure on the main valve 103. The return piping 90 is shown connected with a return elbow 109 in the side of the valve casing and the outlet neck 105 is shown as having a special fitting with a branch 110 to piping 77 and another branch 111 forming a return to the inlet side of the brake pump.

To smoothly effect the decrease in line speed from a maximum of possibly six hundred feet per minute during tensioning to, say, a maximum of one hundred and twenty feet per minute for hoisting, the A-end as well as the B-end is automatically adjusted in the present disclosure.

Figure 9:
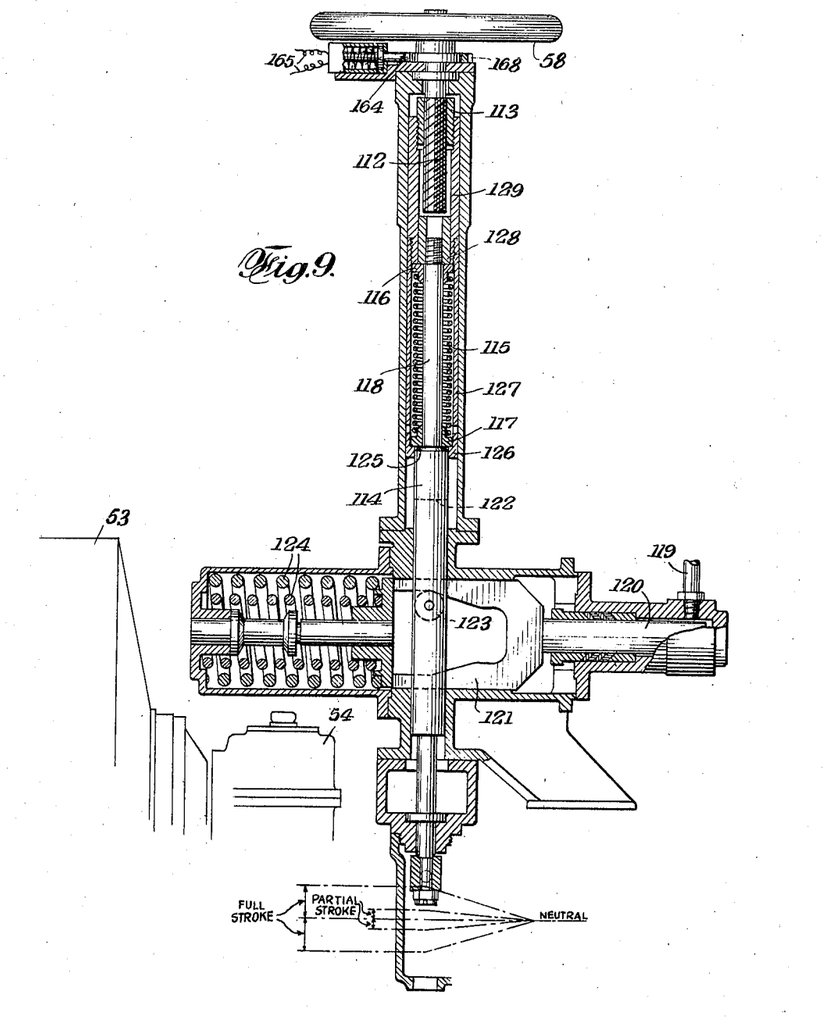
Figure 9 is a broken and vertical sectional view of the manual and supplemental automatic control for the A-end of the hydraulic gear couple, as on substantially the plane of line 9—9 of Figure 1.

In Figure 9 the hand wheel 58 of the A-end is shown connected with a screw 112 operating a nut 113 indirectly connected with the vertical shaft 114 for changing the stroke. A spring 115 interposed between thrust collars 116, 117 loose on the reduced shank 118 of the control shaft 114, provides direct connection stiff enough to carry the control movements transmitted by the hand wheel, but yieldable to the automatic control.

A pipe connection 119 from the discharge side of the A-unit delivers pressure fluid back of a piston or ram 120, Figure 9, carrying a cam fork 121 sliding through slot 122 and engageable with a roller 123 rotatable in such slot to raise the control shaft to reduce the stroke. This cam fork is kept out of action during tensioning by springs 124. This automatic operation will be understood by considering the hand wheel as having been turned to lower the control shaft 114 from the position shown in Figure 9 to the full maximum stroke of the unit. At such time the roller 123 will closely overlie the lower cam face of the fork 121, so that it will be raised by such cam face to reduce the stroke of this pump unit, as the load comes on the line. In such upward movement, the shoulder 125 on the control shaft lifts the lower thrust collar 117 away from the shoulder 126 carried by the sleeve 127 forming part of the nut member 113 and the shoulder element 128 on the upper end of the control shaft telescopes up into the upper sleeve 129 of the nut, leaving the upper thrust collar 116 engaged with the lower end of sleeve 129.

Figure 10:
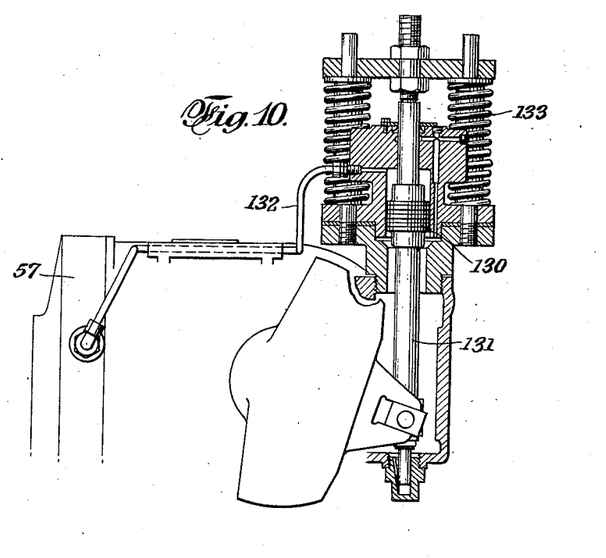
Figure 10 is a broken fragmentary sectional view of the supplemental pressure control for the B-end taken on substantially the plane of line 10—10 of Figure 1.

The reduction in stroke automatically effected at the A-end diminishes the volume of oil pumped to the B-end, thus effecting reduction in speed at the B-end. In the present disclosure, the B-end is additionally controlled to effect reduction in speed with load by means of piston 130, Figure 10, on the control shaft 131 and connected by piping 132 with the high pressure end of this motor. Springs 133 normally hold the control shaft 131 on partial stroke. The pressure in the pump during the tensioning is not sufficient to overcome these springs to change the stroke but with the increased pressure resulting from the load on the line, the stroke will be automatically increased. Conversely, should the load on the line when hoisting, be reduced by an upward movement of the floating object at a greater velocity than the line speed in effect from the manual stroke setting when load hoisting, the resulting reduced pressure in the A and B end units will cause increased line speed to keep the hoist line taut.

Thus, with transfer of the load to the line from the tensioning condition, the speed of the hoist line is decreased by the combination of automatic reduction of stroke at the A-end and the automatic increase of stroke at the B-end. The amount of such decrease in speed will be in direct proportion to the amount of load transferred to the line. Therefore, as the airplane or other floating object rises on the wave, the lifting speed is gradually reduced to accomplish a gradual and resilient taking over from tensioning to hoisting operations.

Figure 13:
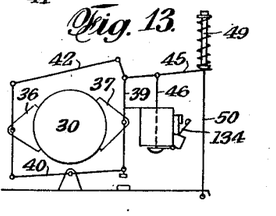
Figure 13 is a similar view showing the position taken by the parts when the load is suspended from the hoist line.

To prevent the brake solenoid overheating from continuous use, a cutout switch 134, Figures 11 to 14, is provided in the present illustration, mounted in the solenoid case 135 and adapted in the position indicated in Figure 13, to include in the circuit, a high resistance holding coil 136, operating with less current than the main solenoid winding 48.

Suitable port and starboard control stands may be provided, as shown at 137 in Figures 1 and 14, carrying the indicators 59 and provided with control handles 138, having four positions; one, "load hoisting", with the solenoid deenergized and the brake set; two, "tensioning", solenoid energized, brake open; three, "tensioning-speed and wave selection", solenoid energized, brake open but controlled by wave speed and wave selecting switch; four, "tensioning-speed selection only", solenoid energized, brake open but controlled by wave speed only. For these purposes, switch handles 138 are connected by wiring 139—140, 139—141—142 with magnetic switch 85 and with wave selector switch 71.

Instead of by-passing the flow from a constantly running booster pump when the aid of the booster pump is not required, this booster pump might be driven by a separate motor which could be automatically cut off when not required, during the actual hoisting of the load.

The self-energizing form of brake illustrated has many advantages in this particular installation. The parts are adjusted as in Figure 11, so that with the solenoid energized and the brake released, the shoes will just clear the brake wheel and the cutout switch 134 will be open. When the brake is set, as in Figure 12, this cut-out switch is closed. With the brake set and a heavy load on the line, the cutout switch opens as in Figure 13.

The meter 59 at the control stand may be calibrated to the generator 60, driven from the brake wheel which forms part of the outer member of the planetary, so as to read directly revolutions of the brake wheel and so that the swing of the pointer while tensioning a floating airplane will clearly represent existing wave and roll conditions.

The first, "load hoisting" position of the control handle 138 is also the "position when not operating", in which the automatic control features of the winch are short-circuited. To effect hoisting of a plane in calm water with no roll of ship, the control wheel at the A-end is adjusted to practically zero speed of hoist line while "tensioning", thus to cause the mechanism to gradually and carefully effect hoisting under such conditions. After automatic hoisting is effected and the plane is clear of the water, the operator may take over manual control, using the A-end control wheel for lifting and lowering. In landing the load it may be desired to effect constant tensioning immediately as the load is landed to assist in maintaining it in an upright position. In such event the control handle can be turned to position 2 "tensioning" to energize the solenoid on the automatic brake, which, however, will not open on account of the load being on the line. Then, as the load is lowered, just as soon as it is landed and the load on the line is relieved, the tensioning will result. By turning the control wheel in the hoisting direction, the load will be supported to the extent of tensioning effect.

The spider 25, Figure 6, carrying the planetary gears and constituting the intermediate member of the differential is shown as made in two complementary parts, rigidly secured together by bolts 143 and as having a hub extension 144 journaled in an annular bearing 145. This spider thus forms a rigid extension of the drum driving pinion shaft 24, which, as shown in Figure 1, has a supporting bearing 146 at the opposite end of the same. The motor shafting 28 is shown as having a bearing at 147 and a pilot bearing 148 in the end of pinion shaft 24 inside the spider 25. The outer, ring gear and brake wheel member of the planetary is shown as having bearings 149 on the pinion shafting, at opposite sides of the spider structure. By this particular arrangement the parts are kept properly alined and running free.

Figure 2:
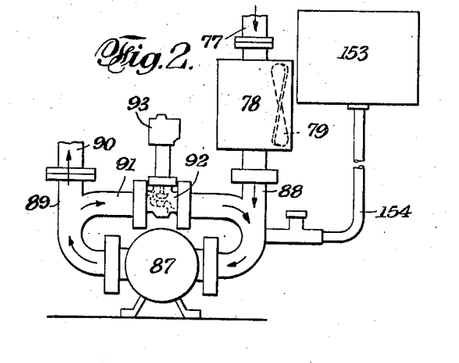
Figure 2 is a cross sectional and end view of the booster pump, radiator and expansion tank, as viewed from the plane represented by line 2—2 of Figure 1.

As indicated in Figures 1 and 2, the hydraulic gear circuit may have an expansion tank 150, connected through a pressure relief valve 151 with the A-end and air vent piping 152 to the oil circuit piping 56, and an expansion tank 153 be connected at 154 with the booster pump, with air vent piping 155 to the brake pump circuit piping 77, 90. In addition to the indication provided by the meter, suitable indicating lights, bells or other signals may be provided. A limit stop 156 may be operated by the drum for automatically shutting off the A-end to prevent overrunning of the drum under any circumstances, and a hand brake is indicated at 157 operable on the power shaft, if desired, to hold the parts in a particular relation.

An automatic brake is indicated at 95 in Figure 1 for holding the motor 53, the A-end 55 and the booster pump 87 when the power is cut off. An emergency hand brake is indicated at 163 for holding the B-end shaft 28 at any time or under any conditions required. Spring detent means for indicating the correct position and for retaining the control hand wheel 58 of the A-end in neutral position may be provided as indicated at 164, Figure 9.

If the main switch 161 be opened when there is a load on the line, this load will not be dropped because the de-energizing of the brake magnet 48 will cause the brake to be automatically set, holding ring gear 30. Motor 53 is then stopped, and consequently, both A-end and B-end. The pull on the line, however, tends to rotate the intermediate member 25 of the differential and the pinions 26 carried thereby reacting against the then stationary ring gear 29, tend to rotate the sun gear 27 connected with the B-end shaft 28. The hydraulic system which then holds the drum may permit a certain amount of "creep". To prevent this, the shaft 28 may be automatically held by equipping the emergency hand brake 163, acting on that shaft, with a brake setting spring and with a brake releasing solenoid 165, Figure 14, similar to the automatic brake acting on the ring gear and by connecting this brake magnet at 166 with the supply branch 82 through an interposed switch 167 adapted to be opened by the A-end control detent 164 when the latter drops into its neutral position notch 168. Consequently, any time the main switch 161 is opened or the A control is put in neutral, the B-end and sun gear shaft 28 will be automatically held. Under such conditions, when the ring gear brake drum 30 is held, the intermediate planetary pinions cannot move and the drum will be thereby positively held, preventing any "creep" with load hanging on the line.

When the line speed of the drum and the driving speed of the B-end are in synchronism, that is, when this driving speed is just right to drive the drum at the maximum upward velocity of the floating object rising on a wave, the sun gear operating as the driver and the planetary gears operating with and so forming part of the drum or driven member will be turning synchronously and the outer or reaction member 29 of the planetary will be stationary. Since this outer element drives generator 60, the latter then produces at the gage 59, an indication that the driving and driven members, broadly the B-end and the drum, are in synchronism, turning in the same direction at the same relative speed. This synchronism or relative speed indicator may be utilized apart from any automatic control as a means for enabling an operator to set the machine for load hoisting operation.

Other devices may be substituted in place of the brake pump 34. Thus, electrical means may be used to furnish the necessary braking resistance equivalent to that supplied by the brake pump. For example, an electrical generator, electrically energized to furnish an opposing rotative resistance at slow or zero rotative speed, may be driven from the outer reaction member of the planetary gearing. This separate supply of electrical energy to produce the braking effect at low speeds is analogous in operation to the booster pump 87 in the hydraulic system.

OPERATION

In the shut-down condition of the apparatus as shown, with the control handle 138 in the No. 1 "not operating" position of Fig. 1 and the hand control wheel of the A-end in the neutral position indicated by shaft 112, in Fig. 14 and with no power supplied to the equipment, the automatic brake 95, holds the motor 53, the A-end pump 55, and the booster pump 87, stationary and similarly, the automatic brake at 163, holds the B-end 57, sun gear shaft 28, while the brake 36, 37, is holding the ring gear of the differential, brake pump 34, generator 60, with the intermediate member of the planetary, on the shaft which drives the drum, locked between the sun and ring gears. At such time therefore, all parts are automatically secured and held stationary.

To prepare the winch for operation, the main switch 161, Fig. 14 is closed to release the automatic brake 95, and start the motor 53, which drives the A-end 55, and booster pump 87. The hand wheel 58 of the A-end is in neutral position and the stroke of the A-end pump is at zero. The operator may then turn this hand wheel to set the stroke and thus cause this pump to operate the B-end motor in one direction or the other for raising or lowering the line. In so turning the hand wheel from neutral, the circuit is closed through the brake releasing magnet 165, thus opening brake 163, to permit the B-end to turn the sun gear 27, and thus cause this through the planetary pinions 26, to operate the drum driving shaft 24 in the required direction and at the desired speed for lifting or lowering of the hook. Then when attachment is made to the plane or other floating object, the hand wheel may be turned to hoist the load under manual control. Thus when the main switch is closed, this first position of the control handle 138, becomes the "load hoisting" position and hoisting or lowering is entirely under control of the hand wheel at the A-end.

In this "1. Load hoisting" position therefore, the differential brake solenoid is de-energized and the brake set, the booster pump solenoid 93 is de-energized and the by-pass valve 92, Fig. 2, opens to permit this pump to operate idly; the fan at 79, being not required to carry off heat generated from the brake pump, is shut down, the generator 60 is still and hence the meter 59 is at zero reading. Thus the speed selection or voltage relay is inoperative and the wave selection switch 68 is inoperative. The A-end is at 31½% stroke or less depending upon speed and the B-end is on maximum stroke approximately 87%.

2. Tensioning

After connection is made, the floating object may be moored and held in the constant tensioning relation by simply turning the hand control to the second, "tensioning" position. When this change is made, the solenoid 48 is energized to release the brake 36, 37, and permit the outer or reaction element 29 of the differential to drive the brake pump 34, to the constant tensioning effect determined by the relief valve 35, and to drive generator 60 correspondingly. At such time, booster pump solenoid 93 is energized to close bypass valve 92, and the fan motor now desired for dissipating heat generated by the brake pump, is started. The meter 59 now energized from the generator, provides R. P. M. or other indication of brake wheel operation as effected by A-end control and speed of the rising and falling floating object. The speed selection relay and wave selection switch are short-circuited. The A-end at such time may be set from approximately 87° to zero stroke and the B-end will be operating at approximately a 42% stroke.

3. Tensioning. Speed and wave selection

This is the full automatic position in which the parts are as in the No. 2 tensioning position, but with the addition of the speed selection relay 63, in circuit and the wave selection switch 68, in a parallel circuit controlling through the power relay 64, the magnetic switch 85, controlling the brake solenoid 48. At a time after a certain predetermined amount of line has been wound on the drum, the wave selection switch 68, operably connected with the drum as in Fig. 1, opens circuit and if at such a time the object is rising at a certain predetermined or maximum velocity, the drum driving intermediate element of the differential and the inner member will be turning at maximum speed in substantial synchronism, leaving the outer reaction element, that is, the ring gear 29, stationary or substantially so. The generator driven from the outer element thus will be at no voltage or predetermined low voltage, opening the voltage relay circuit. The parallel circuits for wave selection and wave speed thus de-energize the magnetic switch and open the circuit of the brake solenoid to set the brake for holding the outer member of the differential. This effects the conversion from constant tensioning to load hoisting. With stoppage of the outer reaction member of the differential, full power is applied to the intermediate member driving the drum. As the load of hoisting comes on the line, the increase in pressure at the A-end through the stroke reducing pressure control Fig. 9, automatically reduces stroke at the A-end and the same increase in pressure at the B-end through the automatic control Fig. 10, increases stroke at the B-end, both then cooperating to proportionately reduce the hoisting speed in proportion to the amount of load transferred to the line. The plane or other object is thus picked up off the rising wave form and lifted at a safe hoisting speed. When this change from tensioning to hoisting is made and the brake pump is stopped, the fan is shut down and the by-pass 91, for the booster pump is automatically opened.

4. Tensioning speed selection only

This fourth position corresponds to the one just described, except that the wave selection is omitted. The wave selection switch is short-circuited and hence inoperative, while the speed selection relay under control of the generator 60, remains operative to accomplish the changeover from tensioning to load hoisting at a time when the line speed of the drum and the driving speed of the B-end are in substantial synchronism and the outer member of the planetary is stationary or substantially so.

In the shut-down position designated No. 1, on the dial, the control features of the winch are short-circuited as first described under the "Load hoisting" heading and therefore with "port" and "starboard" control stations, the moving of the control at the inactive station from position 1 to any other position will have no dangerous effect on the active station.

To effect hoisting of a plane floating in calm water with no roll of ship, the control wheel at the A-end is operated to produce practically zero speed of the hoist line, while "tensioning", when the mechanism will automatically function to gradually and carefully effect hoisting at the desired rate controlled by the hand wheel.

What is claimed is:

1. A winch of the character disclosed comprising in combination, a hoisting drum, power means, a brake pump, differential drive gearing from said power means to said hoisting drum and to said brake pump, control means for effecting operation of said differential gearing to deliver the power from said power means to said hoisting drum exclusive of said brake pump and an electric generator operated from said differential gearing for automatically controlling said control means.

2. In combination, a hoisting drum, power means, a brake pump, differential drive gearing from said power means to said hoisting drum and to said brake pump, an electric indicator for indicating predetermined desirable hoisting relations between said differential drive gearing and hoisting drum, and an electric generator driven from one of the elements of said differential drive gearing and connected to effect corresponding operation of said electric indicator.

3. In combination, a hoisting drum, a pinion shaft for operating the same, a wave selecting limit switch directly driven from said pinion shaft and thereby directly governed by number of turns of said drum, power means, a brake pump, differential drive gearing including one member driven by said power means, a second member arranged to operate said drum operating pinion shaft and a third member arranged to drive said brake pump, means for holding said third member and control connections between said wave selecting limit switch and said means for holding said third member.

4. In combination, a hoisting drum, a pinion shaft for operating the same, a wave selecting limit switch directly driven from said pinion shaft and thereby directly governed by number of turns of said drum, power means, a brake pump, differential drive gearing including one member driven by said power means, a second member arranged to operate said drum operating pinion shaft and a third member arranged to drive said brake pump, means for holding said third member, control connections between said wave selecting limit switch and said means for holding said third member and an electric generator operated from said third member and connected also to exert control over said holding means.

5. In combination, a hoisting drum, driving means therefor, a brake pump which is subject to loss of braking effectiveness at low speeds, differential drive gearing from said driving means to said drum and to said brake pump, a booster pump hydraulically connected with said brake pump said booster pump being unaffected by changing speeds of the brake pump and connected to overcome deficiency of the brake pump at slow speeds, control means for stopping said brake pump and means for rendering said booster pump ineffective when said brake pump is stopped.

6. In combination, a hoisting drum, driving means therefor, a brake pump, differential drive gearing from said driving means to said drum and to said brake pump, a booster pump hydraulically connected with said brake pump, control means for stopping said brake pump and means for rendering said booster pump ineffective when said brake pump is stopped, including a liquid bypass associated with said pumps and valve means in said bypass.

7. In combination, a hoisting drum, a brake pump, power means, differential drive gear from said power means to said hoisting drum and to said brake pump, a cooling circulation system associated with said brake pump, means for stopping said brake pump and means for rendering said cooling circulation system ineffective when said brake pump is stopped and the hoisting drum is being operated from said power means.

8. In combination, a hoisting drum, power means, a brake pump, differential drive gear from said power means to said hoisting drum and to said brake pump, a radiator connected with said brake pump, a cooling fan for said radiator, means for stopping said brake pump and means for stopping said cooling fan when said brake pump is stopped.

9. In combination, a hoisting drum, power means for driving same, a differential gear set including a driven member connected for operating said drum, a driving member and a reaction member, a motor for operating said driving member, means driven by said reaction member for opposing rotation of said reaction member, a self-energizing brake for holding said reaction member and comprising brake shoe means mounted and connected to grip with greater force under rotative influence of engagement with said reaction member, spring means for effecting engagement of said brake shoe means with the reaction member and electrical means for effecting disengagement of said brake shoe means from said reaction member.

10. In combination, a hoisting drum, drive means therefor, a brake pump, a booster pump coupled hydraulically to said brake pump, differential drive gear from said drive means to said hoisting drum and to said brake pump and means for preventing reverse rotation of said brake pump under the force of liquid supplied thereto by said booster pump.

11. In combination, a hoisting drum, drive means therefor, a brake pump, a booster pump coupled hydraulically to said brake pump, differential drive gear from said drive means to said hoisting drum and to said brake pump, means for preventing reverse rotation of said brake pump under the force of liquid supplied thereto by said booster pump, including a ratchet connected with said brake pump, a holding pawl, a frictional drag connected with said pawl and a friction disc engaging said drag to hold the same away from the ratchet in one direction of rotation and to shift the same in engagement with the ratchet upon rotation in the opposite direction.

12. In combination, a hoisting drum, coupled A and B hydraulic units for driving the same, means at the A-end controlled by increase of pressure thereat to reduce the stroke at said A-end and means at said B-end controlled by increase of pressure thereat to substantially simultaneously increase the stroke at said B-end.

13. In combination, a hoisting drum, drive means therefore, a brake pump, differential drive gearing from said drive means to said hoisting drum and to said brake pump and a hydraulic circuit for said brake pump including a pressure regulating valve having a main valve element, a pilot valve for governing the same and means for regulating the action of said pilot valve.

14. In combination, a hoisting drum, a drive motor, a brake pump, a differential gear set including a driven member for operating said drum, a driving member operated by said drive motor and a reaction member connected to operate said brake pump, a brake shiftable for holding said reaction member and a magnet for releasing said brake member, including a magnet coil for holding said brake member in released position and a control switch for rendering said holding coil operative when said brake member is shifted to released position.

15. In combination, a hoisting drum, a brake pump, differential gearing including a driving member, a driven member connected to operate said drum and a reaction member connected to operate said brake pump, a hydraulic couple including a manually regulatable A-end and a variable speed reversible B-end connected to operate said driving member of the differential gearing, a booster pump connected in assisting relation with said brake pump, means for holding said reaction member, means for rendering said booster pump ineffective when said reaction member is so held and means for preventing reverse rotation of said brake pump under force of liquid from said booster pump.

16. In combination, an automatic pressure regulated stroke A-end hydraulic pump, an automatic pressure regulated stroke B-end motor connected in a hydraulic circuit with said A-end, means driven by said B-end at different speeds dependent upon the pressure in the system, hand control means at said A-end and connections for enabling said automatic pressure controlled means at said A-end to assert control at said A-end irrespective of operation of said hand control means.

17. In combination, a hoisting drum constituting driven means, driving means therefor, coupling means enabling relative rotation of said driven and driving means at different speeds, means for operating said driving means at varying speeds for constant tensioning said hoisting drum and means for indicating synchronous operation and relative speeds of said driving and driven means.

18. In combination, a hoisting drum constituting driven means, driving means therefor, coupling means enabling relative rotation of said driven and driving means at different speeds, means for operating said driving means at varying speeds for constant tensioning said hoisting drum, means for indicating the relative speeds of said driving and driven means and means for coupling said driving means in non-varying driving relation to said driven means when the speed and direction of rotation of the both are the same.

19. In combination, a hoisting drum constituting driven means, driving means therefor, coupling means enabling relative rotation of said driven and driving means at different speeds, means for operating said driving means at varying speeds for constant tensioning said hoisting drum and means for indicating the relative speeds of said driving and driven means, including an electric generator driven only as a result of difference in speeds of said driving and driven means.

20. In combination, a hoisting drum constituting driven means, driving means therefor, coupling means enabling relative rotation of said driven and driving means at different speeds, means for operating said driving means at varying speeds for constant tensioning said hoisting drum, means for indicating the relative speeds of said driving and driven means, including an indicating instrument provided with means to show when said driving and driven means are operating in the same direction in a synchronous relation.

21. A winch comprising in combination, a hoisting drum, a motor for operating the same, tensioning means, differential gearing including a drive member operated by said motor, a reaction member connected to operate said tensioning means, an intermediate member connected to operate said hoisting drum and braking means for separately holding said drive member and said reaction member of the differential gearing, and including a brake for the drive member, a brake for the reaction member, means for automatically setting the reaction member brake under predetermined conditions and means for automatically setting both brakes when the winch is shut down.

22. In combination, a drum carrying a line for hoisting a floating object, means for driving said drum to apply substantially constant tension to said line during rising and falling movements of said floating object and including members rotatable in variable speed relations and rotatable in synchronism when the maximum upward velocity of the floating object corresponds with upward hoisting movement of said driving member and means for indicating said synchronous relation of said variable speed members.

23. In combination, a drum carrying a line for hoisting a floating object, means for driving said drum to apply substantially constant tension to said line during rising and falling movements of said floating object and including driving and driven members rotatable in variable speed relations and rotatable in synchronism when the maximum upward velocity of the floating object corresponds with upward hoisting movement of said driving member and means driven jointly by said members rotatable in variable speed relations and governed by synchronous relation of said members to couple said members in a fixed speed relation for automatically converting said driving means from constant tension to positive hoist drive of said drum.

24. In combination, a hoisting drum, a motor for operating same, a differential gear set including a driving member operated by said motor, a driven member connected to operate said drum and a rotatable reaction member in geared relation to said driving and driven members, a rotary power absorbing device driven by said reaction member and constantly effective pawl and ratchet means for permitting rotation of said rotary power absorbing device in one direction at all times and for preventing rotation of said power absorbing device in the opposite direction at any time.

25. In combination, a hoisting drum, a motor for operating same, a differential gear set including a driving member operated by said motor, a driven member for operating said drum, an intermediate rotatable reaction member in geared relation to said driving and driven members, an electric generator driven by said reaction member, electrical control means for one member of said differential gear set, electrically connected to be controlled by said generator and means for preventing reverse rotation of said generator.

26. In combination, a hoisting drum, a motor for operating the same, a differential gear set including a driving member operated by said motor, a driven member connected to operate said drum and a rotatable reaction member in geared relation to said driving and driven members, a ratchet driven by said reaction member of the differential gear set, a pawl or pawls supported to swing toward or away from said ratchet, a disc rotatable with said ratchet and a friction brush or brushes carried by said pawl or pawls for engagement with said disc and positioned to swing said pawl or pawls away from the ratchet with rotation of the disc in one direction and toward the ratchet with rotation of the disc in the reverse direction.

27. In combination, a hoisting drum, a differential gear set including a driving member, a driven member arranged to operate said drum and a reaction member mounted for rotation and in geared relation to said driving and driven members, a rotary braking member driven by said rotatable reaction member, a motor for operating said driving member and thereby effecting, through said differential gear set, operation of said drum and said rotary braking member, brake means for holding said reaction member to cause full power of the motor to be applied to operation of the drum and indicating means operated from rotation of said reaction member and thereby adapted to show when said reaction member is in rotation or stationary as when held so by said holding brake means.

28. In combination, a hoisting drum, a differential gear set including a driving member, a driven member arranged to operate said drum and a reaction member mounted for rotation and in geared relation to said driving and driven members, a rotary braking member driven by said rotatable reaction member, a motor for operating said driving member and thereby effecting, through said differential gear set, operation of said drum and said rotary braking member, means for holding said reaction member to cause full power of the motor to be applied to operation of the drum and indicating means operated from said reaction member and thereby adapted to show when said reaction member is in rotation or stationary as when held so by said holding means, said indicating means including mechanism for exercising a definite control over said holding means for the reaction member.

JOHN C. SMALTZ.
CARL W. KAHLERTH.